(12) United States Patent
Queriault et al.

(10) Patent No.: US 7,153,099 B2
(45) Date of Patent: Dec. 26, 2006

(54) INTER-VANE PLATFORM WITH LATERAL DEFLECTION FOR A VANE SUPPORT OF A TURBINE ENGINE

(75) Inventors: Michele Jacqueline Queriault, Melun (FR); Claude Robert Louis Lejars, Draveil (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/893,270

(22) Filed: Jul. 19, 2004

(65) Prior Publication Data

US 2005/0276691 A1 Dec. 15, 2005

(30) Foreign Application Priority Data

Jul. 31, 2003 (FR) ................... 03 09451

(51) Int. Cl.
*F01D 5/22* (2006.01)
(52) U.S. Cl. ............... 416/2; 416/193 R; 416/193 A
(58) Field of Classification Search ............ 416/2, 416/190, 191, 193 R, 193 A, 196 R, 248; 415/9, 12
See application file for complete search history.

(56) References Cited

U.S. PATENT DOCUMENTS

| 2,751,189 | A | * | 6/1956 | Ledwith | ............... 416/193 A |
| 3,294,364 | A | * | 12/1966 | Stanley | .................... 416/193 A |
| 3,712,757 | A | * | 1/1973 | Goodwin | ................ 416/193 R |
| 4,655,687 | A | | 4/1987 | Atkinson | |
| 5,193,982 | A | * | 3/1993 | Inizan et al. | ............. 416/193 A |
| 5,222,865 | A | * | 6/1993 | Corsmeier | .............. 416/193 A |
| 5,277,548 | A | | 1/1994 | Klein et al. | |
| 5,443,365 | A | | 8/1995 | Ingling et al. | |
| 5,853,286 | A | | 12/1998 | Bussonnet et al. | |
| 6,217,283 | B1 | * | 4/2001 | Ravenhall et al. | ............. 416/2 |
| 6,312,224 | B1 | * | 11/2001 | Knott et al. | ................ 416/248 |
| 6,416,280 | B1 | * | 7/2002 | Forrester et al. | .............. 416/94 |

FOREIGN PATENT DOCUMENTS

| EP | 0 787 890 | | 8/1997 | |
| EP | 1 067 274 | | 1/2001 | |
| GB | 811921 A | * | 4/1959 | ............. 416/193 A |
| WO | WO 93/22539 | | 11/1993 | |

* cited by examiner

*Primary Examiner*—Christopher Verdier
(74) *Attorney, Agent, or Firm*—Oblon, Spivak, McClelland, Maier & Neustadt, P.C.

(57) ABSTRACT

An inter-vane platform, for a vane support disk of a turbine engine fan, includes a central part of one piece with the support disk between two adjacent vanes, and two lateral parts, forming extensions to two lateral edges of the central part, and each designed in such a way as to deflect under the impact of the vane opposite which the lateral part is located.

15 Claims, 2 Drawing Sheets

INTER-VANE PLATFORM WITH LATERAL DEFLECTION FOR A VANE SUPPORT OF A TURBINE ENGINE

The invention relates to the turbine engines sector, and more especially the sector of inter-vane platforms for the support disks of the vanes of turbine engine fans.

As the person skilled in the art knows, the fans of a turbine engine, of which the vanes present a curvilinear foot, comprise support disks for the vanes provided with detachable inter-vane platforms intended to optimize the flow of air between the vanes, and, more precisely, to reconstitute the aerodynamic profile of the internal jet at the level of the vanes.

In keeping with their function, these platforms present lateral edges which, once installed, are placed as close as possible to the vanes. However, in the event of an incident occurring which involves a vane, such as, for example, due to a foreign body being drawn in by the turbine engine, the vane may be displaced (or deflected) and interfere with the lateral edge of one of the adjacent platforms. This can cause substantial damage to the vane (such as, for example, the formation of cracks or fissures which may incur the fracture of the vane) and/or damage at the level of the platform (such as its partial or complete detachment).

Such damage generally incurs a loss of efficiency of the turbine engine, which translates into a loss of performance and even in its being taken out of service.

The object of the invention is therefore to limit, and even eliminate, the consequences of such interference.

To this end, the invention proposes an inter-vane platform for a support disk for vanes of a fan of a turbine engine, comprising a central part, intended to be of one piece with the support disk between two adjacent vanes, and two lateral parts forming an extension of the two lateral parts of the central part, and each arranged in such a way as to deflect under the impact of the vane opposite which it is placed.

Consequently, if a vane is displaced, the lateral part of the platform with which it interferes will deflect or bend, so appreciably limiting the damage while still allowing the vane an increased freedom of flexure.

The platform according to the invention can be realized in different embodiments.

For example, the central part may present a first thickness, while the lateral parts present a second thickness that is less than the first thickness. As a variant or complement, the central part may present a first resistance to deformation, while the lateral parts present a second resistance to deformation that is less than the first resistance. In both these cases, the lateral parts may be realized by the thinning of the lateral edges of the central part.

In the two above cases, the lateral parts and the central part may be of one single block, but, as a variant, the lateral parts may be of one piece with the central part by way of fixation means, such as adhesive bonding or welding.

In addition to this, at least the lateral parts may be made of a shape-memory material, in such a way as to recover its initial shape once the vane has resumed its initial position.

A platform of this kind may be made, at least with regard to its lateral parts, of a metallic material.

The invention likewise refers to a support disk for the vanes comprising a plurality of inter-vane platforms of the type described above, and respectively interlaced between the pairs of adjacent vanes.

Other features and advantages of the invention can be derived from the detailed description below, and from the appended drawings, in which.

The appended drawings may serve not only to complete the invention, but also to contribute to its definition, as applicable.

The invention relates to an inter-vane platform intended to equip a vane support disk for a fan of a turbine engine equipped with vanes with a curvilinear foot (likewise referred to as "wide chord" vanes).

Figure 1:
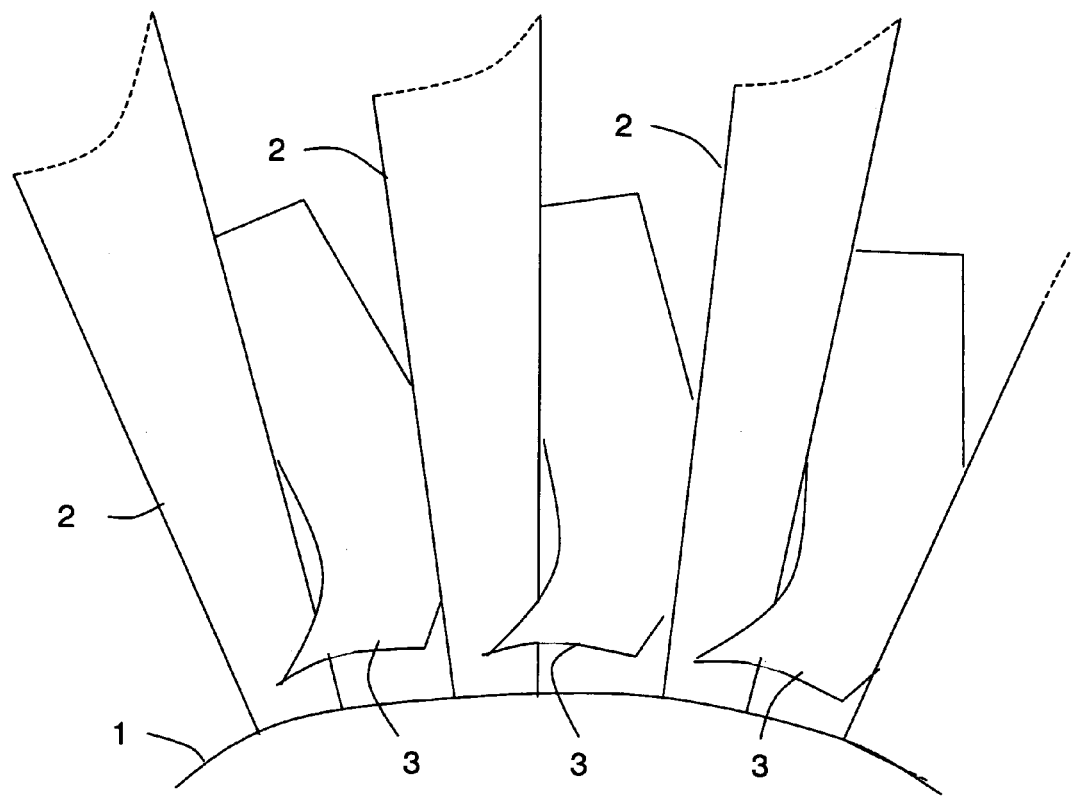
FIG. 1 shows in diagrammatic form a part of a vane support disk in a face view.

As is partially illustrated in FIG. 1, a vane support disk 1 is an element of a fan (not shown), mounted on a rotor shaft, and fixed on which are a plurality of vanes 2, with a curvilinear foot, and a plurality of detachable inter-vane platforms 3. More precisely, each platform 3 is installed on the support disk 1, between two adjacent vanes 2, in such a way as to restore the aerodynamic profile of the internal jet at the level of the vanes.

Each detachable platform 3 comprises in general two or three fixation feet, either as one piece with the fixation feet of the support disk 1 by means of fixing pins, or by interacting with the accommodation elements adapted to said disk.

Figure 2:
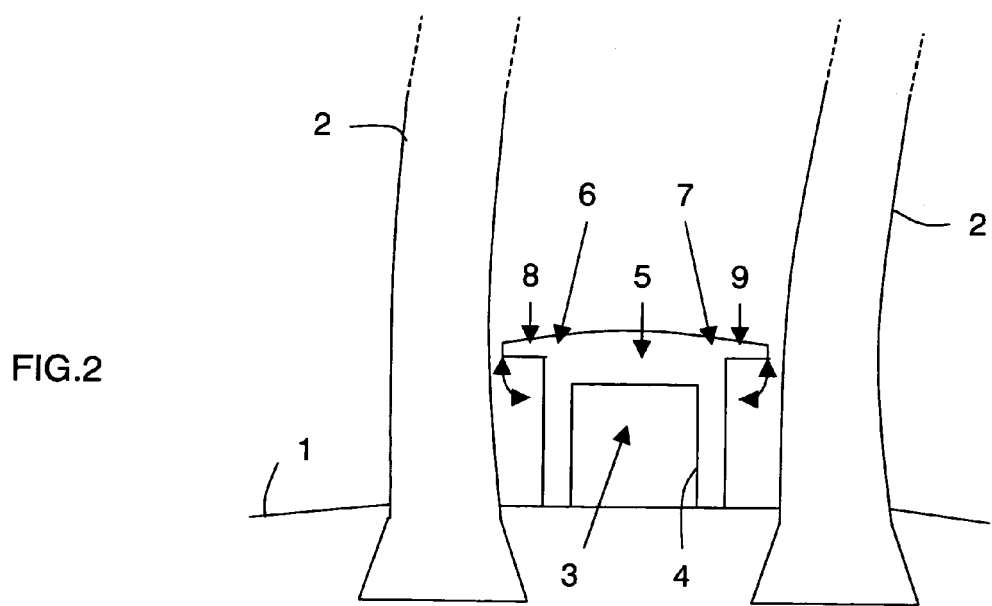
FIG. 2 shows in diagrammatic form, in a side view, an embodiment of an inter-vane platform according to the invention.

In the embodiment illustrated in FIG. 2, the platform 3 is formed of one piece with the support disk 1 by means of fixation feet 4.

According to the invention, the platform 3 comprises a central part 5 that, once installed, serves as a single piece with the support disk 1 (for example by the intermediary of the fixation feet 4). This central part 5 comprises two lateral edges 6 and 7, each located opposite a vane 2, and each extended by a lateral part 8 or 9.

Each lateral part 8, 9 is intended to accommodate an element (or joint) intended to ensure sealing tightness between the platform and the adjacent vane. This element (not shown) is preferably made of rubber or one of its derivatives.

According to the invention, each lateral part 8, 9, is designed in such a way as to deflect or cave in, substantially in accordance with the arrows, under the impact of the vane 2 opposite which it is located, when this is forced to be displaced towards the said lateral part as a result, for example, of an object being drawn in.

In order to obtain this flexure (elastic or not) in the event of pressure being exerted by the adjacent vane 2, the platform may be realized in different embodiments.

A first embodiment, illustrated in FIG. 2, consists of forming the lateral parts 8 and 9 by thinning, either locally or generally, of the lateral edges 6 and 7 of the platform 3.

The thinning is preferably substantial, in such a way as to facilitate the deflection or bending. In other words, the thickness of the lateral parts 8 and 9 is much less than that of the central part 5.

In this first embodiment, the central part 5 and the lateral parts 8 and 9 accordingly constitute one single block.

A second embodiment consists of forming the central part 5 and the lateral parts 8 and 9 from materials which present different deformation resistance values. More precisely, it is necessary for the deformation resistance of the central part 5 to be substantially greater than that of the lateral parts 8 and 9.

Two solutions may be envisaged to obtain this difference in resistance.

A first solution consists of modifying certain physical characteristics of the central part 5 or the lateral parts 8 and 9, for example by exposure to an appropriate particle beam. It is in fact possible either to increase the strength of the central part 5, or to reduce that of the lateral parts 8 and 9. In this case, as in the first embodiment, the central part 5 and the lateral parts 8 and 9 constitute one single-block element. It is important to note that it is possible to combine this embodiment with the first embodiment by carrying out a thinning process and a modification to certain physical characteristics.

Figure 3:
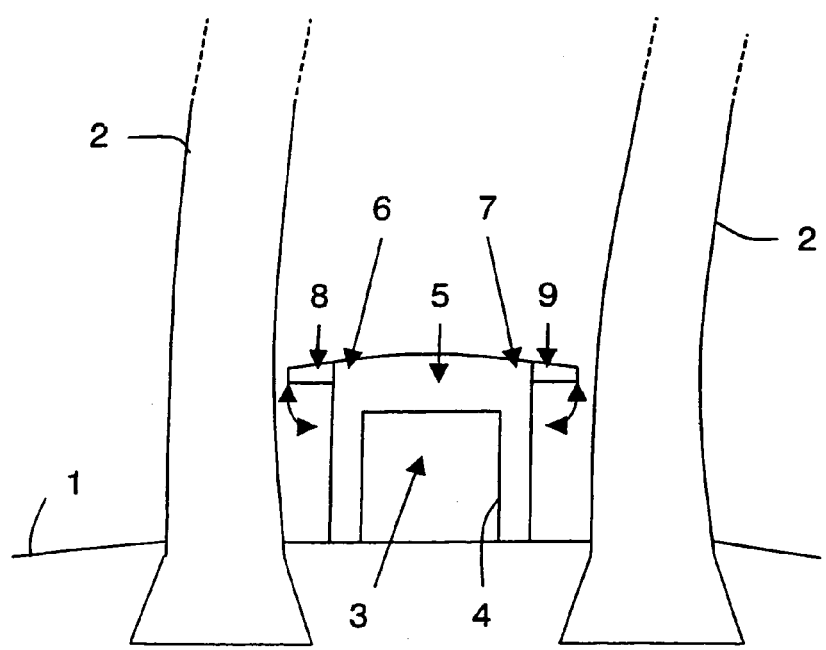
FIG. 3 shows in diagrammatic form, in a side view, an alternate embodiment of an inter-vane platform according to the invention.

A second solution consists of forming the platform 3 by rendering the lateral parts 8 and 9 as one piece with the central part 5, for example by welding or adhesive bonding 10 as shown in FIG. 3. The central part 5 and the lateral parts 8 and 9 are therefore preferably made of different materials, and/or materials which present different physical characteristics (particularly with regard to resistance to deformation). It is also possible in this situation to envisage the use of the lateral parts 8 and 9 as less thick than the central part 5.

In order for the lateral parts 8 and 9 of the platform 3 to be able to resume their initial shape when the vane has resumed its initial position, they can be manufactured from a shape-memory material.

The platform 3 according to the invention is preferably produced by the machining of a metallic block, for example of aluminum; it may, however, be produced from another material, such as a composite material.

The invention is not limited to the embodiments of the inter-vane platform and vane support disk described above solely by way of example, but comprises all the variants which the person skilled in the art might envisage within the framework of the claims hereafter.

The invention claimed is:

1. An inter-vane platform for a support disk for vanes of a fan of a turbine engine, said inter-vane platform comprising a central part configured to be of one piece with said support disk between two adjacent vanes and two lateral parts forming extensions to two lateral edges of said central part, and each lateral part configured to deflect under the impact of the vane opposite which said lateral part is located, and
    wherein at least said lateral parts are made of a shape-memory material.

2. The platform according to claim 1, wherein said lateral parts and said central part are a single block.

3. The platform according to claim 1, wherein said lateral parts are fixed with said central part by way of a fixation device.

4. The platform according to claim 1, wherein said platform is made from a metallic material.

5. A vane support disk, comprising a plurality of inter-vane platforms according to claim 1, interlaced respectively between the pairs of adjacent vanes.

6. An inter-vane platform for a support disk for vanes of a fan of a turbine engine, said inter-vane platform comprising a central part configured to be of one piece with said support disk between two adjacent vanes and two lateral parts forming extensions to two lateral edges of said central part, and each lateral part configured to deflect under the impact of the vane opposite which said lateral part is located, wherein
    said central part presents a first thickness, and said lateral parts present a second thickness less than said first thickness, and
    at least said lateral parts are made of a shape-memory material.

7. The platform according to claim 6, wherein said central part presents a first resistance to deformation, and said lateral parts present a second resistance to deformation less than said first resistance.

8. The platform according to claim 6, wherein said lateral parts and said central part are a single block.

9. The platform according to claim 6, wherein said platform is made from a metallic material.

10. A vane support disk, comprising a plurality of inter-vane platforms according to claim 6, interlaced respectively between the pairs of adjacent vanes.

11. An inter-vane platform for a support disk for vanes of a fan of a turbine engine, said inter-vane platform comprising a central part configured to be of one piece with said support disk between two adjacent vanes and two lateral parts forming extensions to two lateral edges of said central part, and each lateral part configured to deflect under the impact of the vane opposite which said lateral part is located, wherein
    said central part presents a first resistance to deformation, and said lateral parts present a second resistance to deformation less than said first resistance, and
    at least said lateral parts are made of a shape-memory material.

12. The platform according to claim 11, wherein said lateral parts and said central part are a single block.

13. The platform according to claim 11, wherein said platform is made from a metallic material.

14. A vane support disk, comprising a plurality of inter-vane platforms according to claim 11, interlaced respectively between the pairs of adjacent vanes.

15. A turbomachine comprising the inter-vane platform according to claim 1.

* * * * *